United States Patent
Moes et al.

(10) Patent No.: US 9,106,269 B2
(45) Date of Patent: Aug. 11, 2015

(54) SYSTEM AND METHOD FOR PROVIDING COMMUNICATIONS IN A WIRELESS POWER SUPPLY

(75) Inventors: Benjamin C. Moes, Wyoming, MI (US); Joseph S. Melton, Jr., Grand Rapids, MI (US); Dale R. Liff, Kent, OH (US); Andrew C. Zeik, Hudson, OH (US)

(73) Assignee: Access Business Group International LLC, Ada, MI (US)

(*) Notice: Subject to any disclaimer, the term of this patent is extended or adjusted under 35 U.S.C. 154(b) by 771 days.

(21) Appl. No.: 13/311,730

(22) Filed: Dec. 6, 2011

(65) Prior Publication Data

US 2012/0149303 A1 Jun. 14, 2012

Related U.S. Application Data

(60) Provisional application No. 61/420,843, filed on Dec. 8, 2010.

(51) Int. Cl.
*H04B 5/00* (2006.01)

(52) U.S. Cl.
CPC ............ *H04B 5/0025* (2013.01); *H04B 5/0031* (2013.01); *H04B 5/0037* (2013.01)

(58) Field of Classification Search
USPC ........... 455/41.1; 340/10.1, 10.3, 10.4, 10.41, 340/10.42, 13.24, 13.25, 13.26
See application file for complete search history.

(56) References Cited

U.S. PATENT DOCUMENTS

| | | |
|---|---|---|
| 5,105,190 A | 4/1992 | Kip et al. |
| 5,367,242 A | 11/1994 | Hulman |
| 5,455,466 A | 10/1995 | Parks et al. |
| 5,596,567 A | 1/1997 | deMuro et al. |

(Continued)

FOREIGN PATENT DOCUMENTS

| | | |
|---|---|---|
| AT | 506311 | 8/2009 |
| EP | 0 267 009 | 5/1988 |

(Continued)

OTHER PUBLICATIONS

PCT International Search Report for PCT Application No. PCT/US2011/063486 mailed Aug. 17, 2012.

(Continued)

*Primary Examiner* — Tuan A Tran

(74) *Attorney, Agent, or Firm* — Warner Norcross & Judd LLP

(57) ABSTRACT

A wireless power transfer system with a remote device having a communication transmitter configured to initiate communications with a framing pulse to prevent noise from being mistaken for legitimate data. The communication system may employ a bi-phase modulation scheme, and the framing pulse may be generated to present no transitions in the communication signal during a specified period of time. The communication transmitter may produce the framing pulse by applying a load in the remote device. The present invention also provides a method for transmitting communication signals in a wireless power supply system including the general steps of: (a) preceding each communication with a framing pulse configured to present a bit sequence that does not exist in legitimate data communications, (b) maintaining the framing pulse for a period of time sufficient to effectively "reset" the communications receiver and (c) transmitting communications following the framing pulse.

25 Claims, 9 Drawing Sheets

(56) References Cited

U.S. PATENT DOCUMENTS

| | | | |
|---|---|---|---|
| 5,734,254 A | 3/1998 | Stephens | |
| 5,896,278 A | 4/1999 | Tamura et al. | |
| 5,963,012 A | 10/1999 | Garcia et al. | |
| 6,057,668 A | 5/2000 | Chao | |
| 6,080,983 A | 6/2000 | Waczynski et al. | |
| 6,118,249 A | 9/2000 | Brockmann et al. | |
| 6,184,651 B1 | 2/2001 | Fernandez et al. | |
| 6,329,808 B1 | 12/2001 | Enguent | |
| 6,427,065 B1 | 7/2002 | Suga et al. | |
| 6,469,472 B1 | 10/2002 | Aoshima et al. | |
| 6,498,923 B2 * | 12/2002 | Ikefuji et al. | 455/41.1 |
| 6,768,445 B1 * | 7/2004 | Johnson | 342/32 |
| 6,844,702 B2 | 1/2005 | Giannopoulos et al. | |
| 6,856,274 B1 * | 2/2005 | Johnson | 342/32 |
| 6,912,137 B2 | 6/2005 | Berghegger | |
| 7,071,866 B2 * | 7/2006 | Iny et al. | 342/42 |
| 7,076,206 B2 | 7/2006 | Elferich et al. | |
| 7,263,330 B2 * | 8/2007 | Wuidart | 455/41.1 |
| 7,366,466 B2 | 4/2008 | Forster et al. | |
| 7,623,831 B2 | 11/2009 | Forster et al. | |
| 7,697,892 B2 | 4/2010 | Komoriya | |
| 7,825,625 B2 | 11/2010 | Posamentier | |
| 7,915,858 B2 | 3/2011 | Liu et al. | |
| 7,953,369 B2 | 5/2011 | Baarman | |
| 8,004,235 B2 | 8/2011 | Baarman et al. | |
| 8,060,011 B2 | 11/2011 | Jin | |
| 8,063,747 B2 * | 11/2011 | Drucker | 340/10.4 |
| 8,090,550 B2 | 1/2012 | Azancot et al. | |
| 8,194,583 B2 | 6/2012 | Zhu et al. | |
| 8,248,204 B2 * | 8/2012 | Takeshima et al. | 340/4.34 |
| 8,325,081 B2 * | 12/2012 | Rivers et al. | 342/45 |
| 2002/0022454 A1 | 2/2002 | Serra et al. | |
| 2002/0154518 A1 | 10/2002 | Elferich et al. | |
| 2003/0214821 A1 | 11/2003 | Giannopoulos et al. | |
| 2005/0068019 A1 | 3/2005 | Nakamura et al. | |
| 2005/0099270 A1 * | 5/2005 | Diorio et al. | 340/10.51 |
| 2005/0127868 A1 | 6/2005 | Calhoon et al. | |
| 2007/0042729 A1 | 2/2007 | Baaman et al. | |
| 2007/0139159 A1 | 6/2007 | Mittal et al. | |
| 2007/0228833 A1 | 10/2007 | Stevens et al. | |
| 2008/0194200 A1 | 8/2008 | Keen et al. | |
| 2009/0001929 A1 | 1/2009 | Posamentier | |
| 2009/0011706 A1 | 1/2009 | Wilson et al. | |
| 2009/0101716 A1 | 4/2009 | Mani et al. | |
| 2009/0133942 A1 | 5/2009 | Iisaka et al. | |
| 2009/0239496 A1 | 9/2009 | Toncich et al. | |
| 2009/0243394 A1 | 10/2009 | Levine | |
| 2010/0072825 A1 | 3/2010 | Azancot et al. | |
| 2010/0142509 A1 | 6/2010 | Zhu et al. | |
| 2010/0151808 A1 | 6/2010 | Toncich et al. | |
| 2010/0171369 A1 | 7/2010 | Baarman et al. | |
| 2010/0240303 A1 | 9/2010 | Charrat | |
| 2011/0050164 A1 | 3/2011 | Partovi et al. | |
| 2011/0065398 A1 | 3/2011 | Liu et al. | |
| 2011/0163608 A1 | 7/2011 | Brohlin et al. | |
| 2011/0199045 A1 | 8/2011 | Hui et al. | |
| 2011/0204711 A1 | 8/2011 | Norconk et al. | |
| 2012/0066524 A1 | 3/2012 | Kim et al. | |
| 2012/0083205 A1 | 4/2012 | Marcu et al. | |
| 2012/0104997 A1 | 5/2012 | Carobolante | |
| 2012/0155344 A1 | 6/2012 | Wiley et al. | |

FOREIGN PATENT DOCUMENTS

| | | |
|---|---|---|
| EP | 0 533 247 | 3/1993 |
| EP | 0 878 891 | 11/1998 |
| JP | 09-103037 | 4/1997 |
| WO | WO 2007/024416 | 3/2007 |
| WO | 2007090114 | 8/2007 |
| WO | WO 2007/090114 | 8/2007 |

OTHER PUBLICATIONS

PCT Written Opinion of the International Searching Authority for PCT Application No. PCT/US2011/063486 mailed Aug. 17, 2012.
Invitation to Pay Additional Fees and Annex for International Application No. PCT/US2011/063486, dated Feb. 13, 2012.
Developing Digital Communication Interfaces with LabVIEW FPGA (Part 2), National Instruments, Nov. 30, 2009.

* cited by examiner

SYSTEM AND METHOD FOR PROVIDING COMMUNICATIONS IN A WIRELESS POWER SUPPLY

BACKGROUND OF THE INVENTION

The present invention relates to wireless power supplies, and more particularly to systems and methods for providing communications in a wireless power supply.

There is an increased effort in the market to develop wireless power supply systems capable of charging and/or powering a wide variety of electronic devices. Wireless power supply systems allow power to be delivered to an electronic device without the need for direct-wired connections. This eliminates a variety of problems associated with direct electrical connections, such as the mess and clutter associated with cords as well as the inconvenience associated with repeatedly plugging in and disconnecting charging cords from portable electronic devices.

Many conventional wireless power supply systems rely on inductive power transfer (i.e. the transfer of power using electromagnetic fields) to convey electrical power without wires. A typical inductive power transfer system includes an inductive power supply that uses a primary coil to wirelessly transfer energy in the form of a varying electromagnetic field and a remote device that uses a secondary coil to convert the energy in the electromagnetic field into electrical power. Recognizing the potential benefits, some developers have focused on producing wireless power supply systems with adaptive control systems capable of adapting to maximize efficiency and provide appropriate operation to a variety of different types of devices under a wide range of circumstances. Adaptive control systems may vary operating parameters, such as resonant frequency, operating frequency, rail voltage or duty cycle, to supply the appropriate amount of power and to adjust to various operating conditions. For example, it may be desirable to vary the operating parameters of the wireless power supply based on the number of electronic device(s), the general power requirements of the electronic device(s) and the instantaneous power needs of the electronic device(s). As another example, the distance, location and orientation of the electronic device(s) with respect to the primary coil may affect the efficiency of the power transfer, and variations in operating parameters may be used to optimize operation. In a further example, the presence of parasitic metal in range of the wireless power supply may affect performance or present other undesirable issues. The adaptive control system may respond to the presence of parasitic metal by adjusting operating parameters or shutting down the power supply. In addition to these examples, those skilled in the field will recognize additional benefits from the use of an adaptive control system.

To provide improved efficiency and other benefits, it is not uncommon for conventional wireless power supply systems to incorporate a communication system that allows the remote device to communicate with the power supply. In some cases, the communication system allows one-way communication from the remote device to the power supply. In other cases, the system provides bi-directional communications that allow communication to flow in both directions. For example, power supply and the remote device may perform a handshake or otherwise communicate to establish that the remote device is compatible with the wireless power supply. The remote device may also communicate its general power requirements, as well as information representative of the amount of power it is receiving from the wireless power supply. This information may allow the wireless power supply to adjust its operating parameters to supply the appropriate amount of power at optimum efficiency. These and other benefits may result from the existence of a communication channel from the remote device to the wireless power supply.

An efficient and effective method for providing communication in a wireless power supply that transfers power using an inductive field is to overlay the communications on the inductive field. This allows communication without the need to add a separate wirelessly communication link. One common method for embedding communications in the inductive field is referred to as "backscatter modulation." Backscatter modulation relies on the principle that the impedance of the remote device is conveyed back to the power supply through reflected impedance. With backscatter modulation, the impedance of the remote device is selectively varied to create a data stream (e.g. a bit stream) that is conveyed to power supply by reflected impedance. For example, the impedance may be modulated by selectively applying a load resistor to the secondary circuit. The power supply monitors a characteristic of the power in the tank circuit that is impacted by the reflected impedance. For example, the power supply may monitor the current in the tank circuit for fluctuations that represent a data stream.

A variety of schemes have been developed for modulating a data signal onto an inductive field. One common approach is differential bi-phase modulation. Differential bi-phase modulation uses a scheme in which the signal varies from high to low at every clock pulse. To encode a "1," the modulator adds an additional transition during the time period associated with that bit. To encode a "0," the clock pulse transition is the only transition to occur during the time period associated with that bit.

Wireless power communications can be disrupted if the device being powered presents a noisy load. The power supply can be especially susceptible to noise that occurs at that same frequency as the data communications. For example, if occurring in the same frequency range as the data communications, it is possible that a random pattern in the noise will be misinterpreted as the preamble or start bits in a legitimate communication signal. If this occurs, the power supply may think it is receiving legitimate data and attempt to obtain data, for example, in the form of a data packet, following the false preamble. Although the power supply should eventually determine that the data packet is not legitimate, the power supply may be occupied with the illegitimate packet, which would delay its ability to recognize legitimate data. For example, if a legitimate signal is received by the communication receiver while it is occupied with an illegitimate signal, the communication receiver may misinterpret the legitimate preamble/start bits as data associated with the illegitimate signal, thereby preventing it from being recognized by the communication receiver.

SUMMARY OF THE INVENTION

The aforementioned problems are overcome by the present invention wherein a wireless power supply system includes a remote device with a communication transmitter configured to preface communications with a framing pulse. The framing pulse is configured to interrupt a false preamble and present a signal pattern that can not be mistaken for a legitimate start bit. In use, the framing pulse permits the communication receiver to reset its communication decoding preparing it to decode a legitimate message transmission following the framing pulse.

The present invention may be used with a communication system that employs a bi-phase modulation scheme, which includes at least one transition during each clock pulse. In such applications, the framing pulse may be generated to present no transitions in the communication signal during a specified period of time. Because bi-phase modulation includes a transition with each clock pulse, the communication receiver will recognize that the framing pulse, which has no transitions, is not a legitimate communication transmission. This will, in effect, reset the communication receiver so that it is not occupied with efforts to analyze illegitimate data in the communication buffer when a legitimate communication transmission is sent following the framing pulse.

In one embodiment, the communication receiver may have a controller with a communication threshold for dictating the value of the communication signal. The controller converts the communication signal into a high or low signal depending on whether the communication signal is above or below the communication threshold. In one embodiment, the framing pulse moves the signal away from the communication threshold by an amount that is greater than the anticipated amplitude of noise in the system. In such embodiments, the framing pulse will maintain the signal either above or below the threshold without transitions despite normal amplitude variations caused by noise. In this way, the framing pulse provides a "quiet time" during which the communication receiver will become disengaged from any efforts to extract communication from the data in the buffer. This means that the communication receiver will be ready to receive the real communication message that will be following the framing pulse.

In one embodiment, the communication transmitter produces the framing pulse by applying a load to the secondary circuit at a location where the load will be communicated back to the wireless power supply through reflected impedance. The load may be a communication resistor. The communication resistor may have a value selected to bias the communication signal so that load fluctuations caused by noise while the communication resistor is applied will not cause the signal to cross the communication threshold. If desired, the framing pulse may be created by the same load resistor used to generate communication signals. Alternatively, the remote device may include a separate load resistor for producing the framing pulse.

In one embodiment, the communications receiver is configured to "clear" the communication buffer once it recognizes the framing pulse. The communications receiver may be configured to recognize a framing pulse when the signal does not transition for a period of time. This period of time may be measured by a number of bit-times (i.e. the amount of time associated with the transmission of a single bit), such as three bit-times. For example, in one embodiment, the buffer may be a buffer of fixed length that includes a pointer that points the current location in the buffer. In such applications, the buffer may be reset by changing the pointer back to the first location in the buffer. Other types of buffers may be used. For example, a circular buffer with two pointers for start and end may be used. As another example, the buffer may be a dynamic buffer that does not have a fixed length.

In one embodiment, the framing pulse allows the communication receiver (e.g. the controller) to determine whether there is communication inversion. More specifically, in some applications, the communication load may bias the signal high and in other applications, the communication load may bias the signal low. The bias may vary from high to low depending on the characteristics of the system. Knowledge of whether the communication load is biasing the signal high or low can be useful during communication detection. For example, it may be useful in implementing a communication detection scheme that involves looking at a single edge of the communication signal to recognize transitions.

The present invention also provides a method for transmitting communication signals in a wireless power transfer system including the general steps of: (a) in the communication transmitter, transmitting a framing pulse that is configured to present the communication receiver with a signal that does not exist in legitimate data communications, (b) maintaining the framing pulse for a period of time sufficient for the communications receiver to recognize the framing pulse and (c) transmitting communications following the framing pulse. In one embodiment, the wireless power transfer system may use bi-phase modulation to communicate data. In such embodiments, the framing pulse may be a signal without any transitions and the step of transmitting may include transmitting communications using bi-phase modulation. The method may include the step of clearing and/or resetting the communication buffer in the communication receiver upon recognition of the framing pulse. The framing pulse transmitting step may include the step of applying a load resistor to the circuitry in the remote device at a location where its presence will be communicated to the communications receiver by reflected impedance. The method may also include the step of selecting a framing pulse load resistor of sufficient magnitude to prevent anticipated noise variations from overriding the framing pulse and creating a transition during the framing pulse. The communication transmitting step may include selectively applying the load resistor to produce the desired bit sequence.

The present invention provides a simple and effective system and method for improving communications in a wireless power supply system. The framing pulse can be easily implemented in many existing communication systems that use bi-phase modulation without requiring any changes in the communication receiver. Instead, in many existing systems, the framing pulse will ensure that the communication receiver is not occupied with efforts to determine if noise (or other illegitimate signal variations) is communications when a legitimate communication transmission is sent. The framing pulse can be generating using the communication resistor present in many conventional remote devices that use a backscatter modulation scheme. As a result, the present invention can be implemented in many applications without additional circuit components. The communication resistor may be selected to provide sufficient bias to prevent conventional noise from interfering with the framing pulse. The framing pulse may also be used to quickly and definitively determine whether the communication resistor is biasing communications high or low.

These and other objects, advantages, and features of the invention will be more fully understood and appreciated by reference to the description of the current embodiment and the drawings.

Before embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

Figure 1:
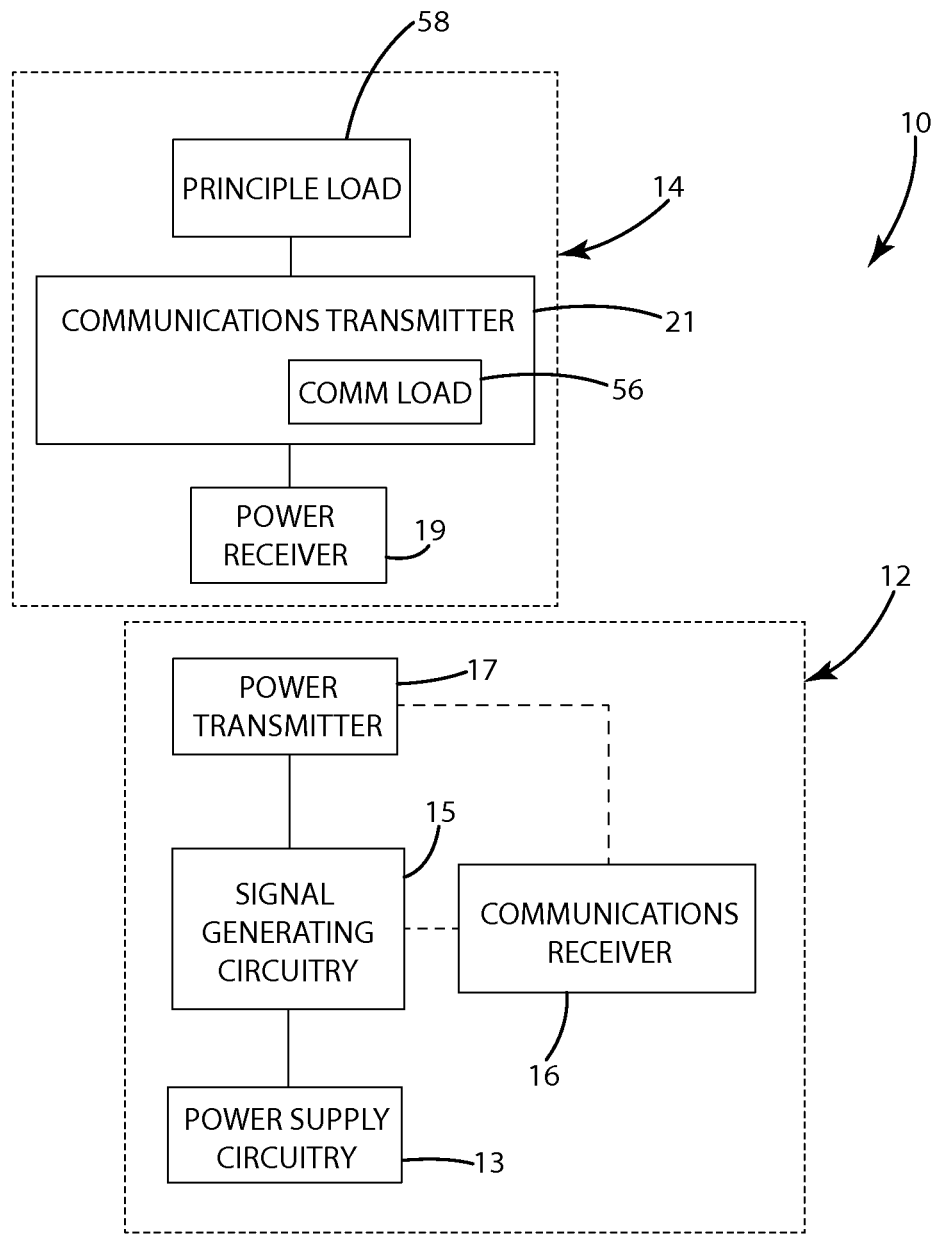
FIG. 1 is a schematic representation of a wireless power transfer system in accordance with an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations of those terms is meant to encompass the items listed thereafter and equivalents thereof as well as additional items and equivalents thereof.

DESCRIPTION OF THE CURRENT EMBODIMENT

A wireless power transfer system 10 with a wireless power supply 12 and a remote device 14 in accordance with an embodiment of the present invention are shown in FIG. 1. The wireless power supply 12 generally includes power supply circuitry 13, signal generating circuitry 15, a power transmitter 17 and a wireless communication receiver 16. The wireless communication receiver 16 is configured to receive communication from the remote device 14 via backscatter modulation. The remote device 14 generally includes a power receiver 19, a communications transmitter 21 and a principle load 58. The communication transmitter 21 may include a communication load 56 that can be selectively applied to vary the impedance of the remote device 14 and thereby create data signals that are reflected back to the wireless power supply 12 through reflected impedance. The communication transmitter 21 can be configured to send a framing pulse prior to sending a communication signal, such as a communication packet. The framing pulse is a signal that does not correspond with any legitimate data signals. Accordingly, the framing pulse is unmistakably not a legitimate communication signal and therefore ensures that the communication receiver 16 is not occupied with efforts to determine whether a random pattern of bits in the noise is a true communication transmission. This effectively resets the communication receiver 16 in the sense that it puts the communication receiver 16 in a state in which it is ready to receive the immediately following communication signal.

A remote device 14 in accordance with an embodiment of the present invention will now be described in more detail with respect to FIG. 2. The remote device 14 may include a generally conventional electronic device, such as a cell phone, a media player, a handheld radio, a camera, a flashlight or essentially any other portable electronic device. The remote device 14 may include an electrical energy storage device, such as a battery, capacitor or a super capacitor, or it may operate without an electrical energy storage device. The components associated with the principle operation of the remote device 14 (and not associated with wireless power transfer) are generally conventional and therefore will not be described in detail. Instead, the components associated with the principle operation of the remote device 14 are generally referred to as principle load 58. For example, in the context of a cell phone, no effort is made to describe the electronic components associated with the cell phone itself.

The remote device 14 generally includes a secondary coil 50, a rectifier 52, a communications transmitter 21 and a principle load 58. The secondary coil 50 may be a coil of wire or essentially any other inductor capable of generating electrical power in response to the varying electromagnetic field generated by the wireless power transfer system 10. The rectifier 52 converts the AC power into DC power. Although not shown, the device 14 may also include a DC-DC converter in those embodiments where conversion is desired. The communications transmitter 21 of this embodiment includes a controller 54 and a communication load 56. In addition to its role in communications, the controller 54 may be configured to perform a variety of functions, such as applying the rectified power to the principle load 58. In some applications, the principle load 58 may include a power management block capable of managing the supply of power to the electronics of the device 14. For example, a conventional electronic device may include an internal battery or electrical energy storage device (such as a capacitor or super capacitor). The power management block may determine when to use the rectified power to charge the device's internal battery and when to use the power to power the device. It may also be capable of apportioning the power between battery charging and directly powering the device. In some applications, the principle load 58 may not include a power management block. In such applications, the controller 54 may be programmed to handle the power management functions or the electronic device 14 may include a separate controller for handling power management functions.

With regard to its communication function, the controller 54 includes programming that enables the controller 54 to selectively apply the communication load 56 to create data communications on the power signal using a backscatter modulation scheme. In operation, the controller 54 may be configured to selectively couple the communication load 56 to the secondary coil 50 at the appropriate timing to create the desired data transmissions. Further, the controller 54 may be configured to selectively couple the communication load 56 to the secondary coil 50 to generate the framing pulse. The communication load 56 may be a resistor or other circuit component capable of selectively varying the overall impedance of the remote device 14 (e.g. a capacitor or inductor). In this embodiment, the framing pulse is generated by the same load used for generating communications (i.e. communication load 56), but separate loads may be use for communications and the framing pulse in alternative embodiments. Although shown coupled to the controller 54, the communications load 56 may be located in essentially any position in which it is capable of producing the desired variation in the impedance of the remote device 14, such as between the secondary coil 50 and the rectifier 52. Although the remote device 14 of FIG. 2 is described with a single controller that handles all of the control functions of the wireless power transfer components, these functions may be divided across multiple controllers.

As noted above, the wireless power supply 12 of FIG. 1 generally includes an AC mains input 20, power supply circuitry 13, signal generating circuitry 15, power transmitter 17 and a communications receiver 16. FIG. 2 provides a more detailed schematic of one embodiment of the wireless power supply 12 of FIG. 1. In this embodiment, the power supply circuitry 13 generally includes a rectifier 22 and a DC-DC converter 24. The rectifier 22 and DC-DC converter 24 provide the appropriate DC power for the power supply signal. The power supply circuitry 13 may alternatively be essentially any circuitry capable of transforming input power to the form used by the signal generating circuitry 15. In this embodiment, the signal generating circuitry 15 includes a portion of controller 26 and switching circuitry 28. The controller 26 is configured, among other things, to operate the switching circuitry 28 to apply the desired power supply signal to the power transmitter 17. In this embodiment, the power transmitter 17 includes a tank circuit 30 having a primary coil 34 and a ballast capacitor 36. In this embodiment, the communication receiver 16 includes a detector circuit 32 and portions of controller 26. The detector circuit 32 is coupled to the tank circuit 30 in this embodiment, but may be coupled elsewhere as described in more detail below. As can be seen, the wireless power supply 12 of this embodiment includes a controller 26 that performs various functions, such as controlling the timing of the switching circuit 28 and cooperating with the detector circuit 32 to extract and interpret communications signals. These functions may alternatively be handled by separate controllers or other dedicated circuitry.

Figure 3A:
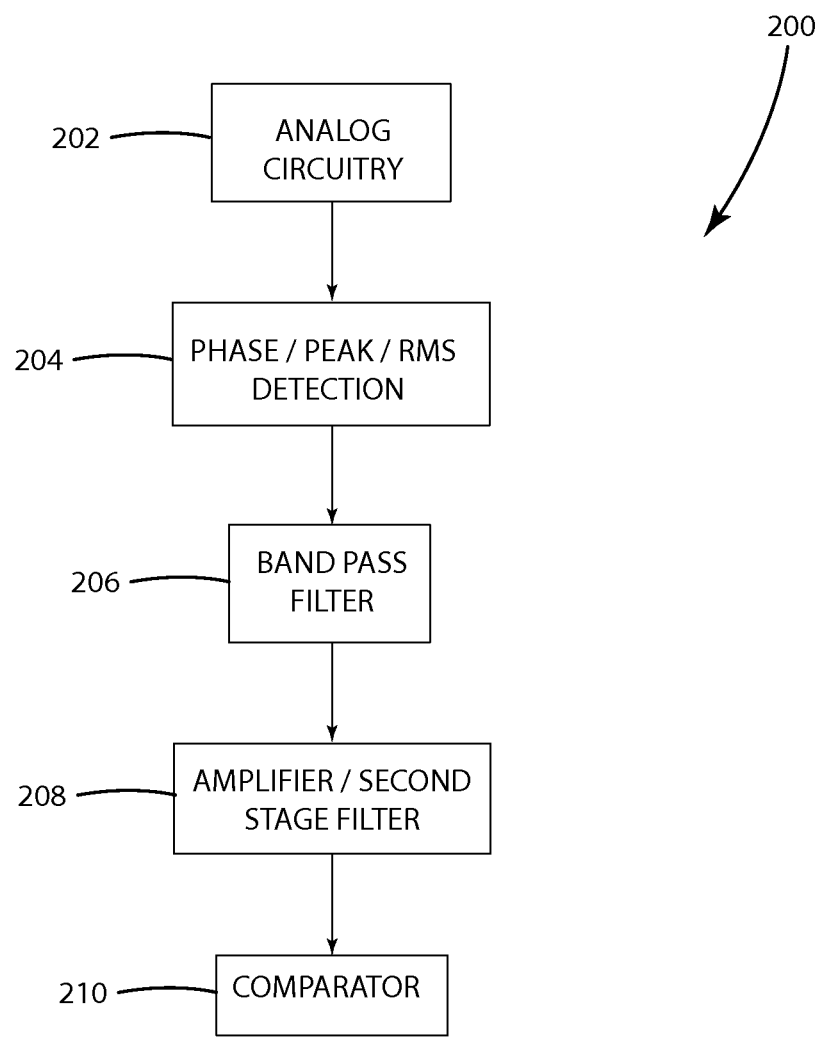
FIG. 3A is a generalized representation of a detector circuit.

The detector circuit may vary from application to application. FIG. 3A is a diagram showing a somewhat generalized representation of a detector circuit 200. In this generalization, the detector 200 includes circuitry 202 that senses one or more characteristics of the power in the power transmitter, such as current and/or voltage. The sensing circuitry 202 may be analog circuitry as shown in FIG. 3A. The detector circuit 200 may include circuitry 204 that converts the sensed characteristic of power into a usable voltage signal. For example, the conversion circuitry 204 may provide an output representative of the voltage, current, phase or other characteristic of the power. The output of the conversion circuitry 204 may represent phase, peak or RMS values. The detector circuit 200 may include filter circuitry 206 that filters out components of the signal that are not within the frequency range associated with communications. For example, the filter circuitry 206 may filter out the carrier signal and low frequency load shifts. The detector circuit 200 may also include an amplifier circuitry 208 that further amplifies and filters the signal. For example, the amplifier circuitry 208 may amplify the signal and then further filter out the carrier signal and low frequency load shifts. The detector circuit 200 may further include a comparator 210 that converts the output of the amplifier circuitry 208 into a digital signal.

Figure 3B:
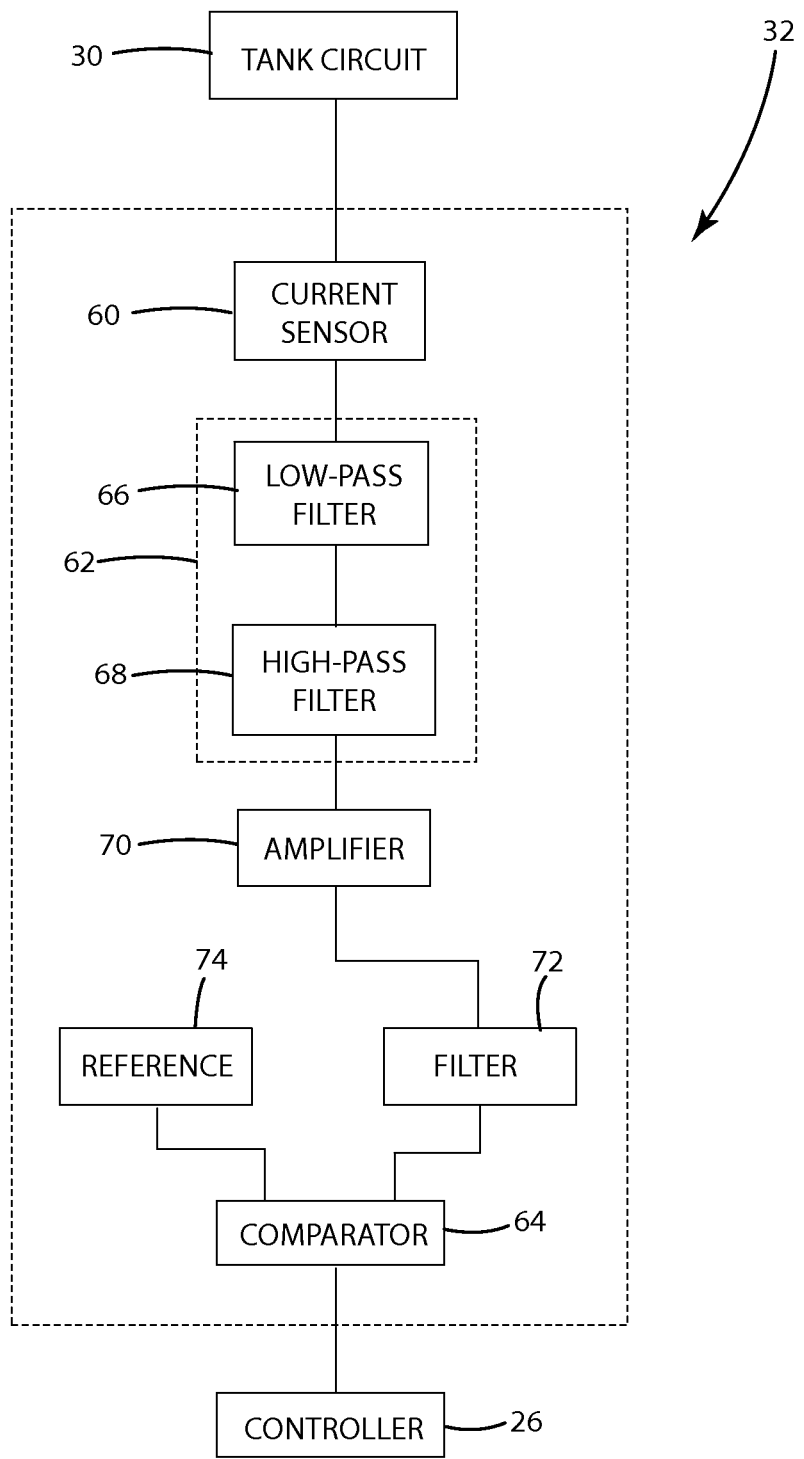
FIG. 3B is a schematic representation of a detector circuit.

The detector circuit described generally above may be implemented in a wide variety of embodiments. In one type of implementation, the detector circuit 32 is configured to produce an output signal that is indicative of the current ($I_t$) in the tank circuit 30. For example, the detector circuit 32 may sense the current in the tank circuit 30 and convert the sensed current into a stream of high and low signals that can be provided to a controller, such as controller 26, which interprets the high and low signals as a binary data stream. One exemplary embodiment of this type of detector circuit is shown in FIG. 3B. In this embodiment, the communication receiver 16 includes detector circuit 32, which generally speaking provides the controller 26 with a binary stream representative of the current fluctuations that occur in the tank circuit 30 within a prescribed frequency range. As shown in FIG. 3B, the detector circuit 32 generally includes a current sensor, such as current-sense transformer 60, filtering and conditioning circuitry 62 and a comparator 64. In this embodiment, the current-sense transformer 60 is coupled to the tank circuit 30 to produce a voltage signal having an amplitude that is proportional to the current in the tank circuit 30. The detector circuit 32 may also include filtering and conditioning circuitry 62 to filter and condition the output of a current sense transformer 60 before it is passed to comparator 64. In this embodiment, the detector circuit 32 includes a low-pass filter 66 that functions primarily to attenuate high frequency oscillations that are above the frequency range of the data communications. The low-pass filter 66 may be a 2-pole filter with circuit components selected to set the appropriate filtering range, but other types of filters may alternatively be used in the detector circuit 32. The detector circuit 32 may also includes a high-pass filter 68 that functions primarily to remove (or attenuate) low frequency oscillations that are below the frequency range of the data communications, including without limitation any DC component in the signal.

The detector circuit 32 may also include an amplifier 70 for amplifying the signal after it has passed through the low-pass and high-pass filters. If used, the amplifier 70 may be configured to amplify the signal to help differentiate the signal from the noise. The amplifier 70 may be a generally conventional AC-coupled amplifier or essentially any other suitable amplifier. If desired, the detector circuit 32 may also include a supplemental filter 72 for filtering the output of the amplifier 70. The supplemental filter may be a low-pass filter (such as a 2-pole filter) configured to remove high frequency noise that may be present in the output of the amplifier 70.

The comparator 64 of this embodiment is configured to provide a high or low output based on a comparison of the amplitude of the input signal with a reference signal. As shown, the comparator 64 includes a first input that receives the filtered and conditioned current sense transformer signal and a second input that is coupled to a reference signal 74. In this embodiment, the reference signal is set to be slightly lower than the DC component of the amplified signal. Accordingly, the comparator output will remain high when no communication is present in the signal. If communication is present, then the comparator output toggles between high and low in correspondence with the communication signals.

As noted above, controller 26 is part of the communication receiver 16 in the sense that it receives an input signal from the comparator 64. The output of the comparator 64 is fed to the controller 26, which analyzes the signals as a binary data stream. In the illustrated embodiment, the remote electronic device uses a Bi-Phase Mark encoding scheme to modulate data bits onto the power signal. With this method, a binary 1 is represented in the communication stream using two transitions in the power signal with the first transition coinciding with the rising edge of the clock signal and the second transition coinciding with the falling edge of the clock signal. A binary 0 is represented by a single transition in the power signal coinciding with the rising edge of the clock signal. Accordingly, the controller 26 is configured to decode the comparator 64 output using a corresponding scheme.

The controller 26 of this embodiment includes a communications buffer that retains a certain number of sequential output values from the comparator 64. The communication buffer may vary from application to application, but in the illustrated embodiment is of a fixed length and the controller 26 maintains a pointer that points to the current position in the buffer. In this embodiment, the communication buffer may be effectively reset by resetting the pointer to the first bit in the buffer. The size of the buffer may vary from application to application, but may, in the illustrated embodiment, be of sufficient size (e.g. 300 bits) to accommodate a communication packet (e.g. a header, a large payload and a checksum). The controller 26 of this embodiment is configured to sequentially analyze data in the buffer to determine if a legitimate data transmission has been received. For example, the controller 26 may evaluate the data one bit at a time to determine if the sequence of bits corresponds with a legitimate message transmission. If so, the controller 26 responds in accordance with the message. If it does not correspond with a legitimate message transmission, the controller 26 resets the pointer for the buffer and begins looking for a legitimate message anew. In operation, controller 26 may be configured to maintain the pointer at the first location in the buffer until a transition occurs in the communication signal. As a result, the controller 26 may not begin refilling the buffer until after the framing pulse has completed. In the illustrated embodiment, a buffer is not used for the preamble bits. Rather, the controller 26 waits to receive the first start bit before incrementing the buffer pointer.

Although the present invention is described in connection with a detector circuit 32 having a variety of analog circuitry for filtering and conditioning the signal before it is fed to the controller 26, the filtering, conditioning and/or comparator functions may alternatively be carried out using a digital signal processor (DSP). In this alternative, the output of current sense transformer 66 may be fed into a DSP (not shown). The DSP converts the analog signal into a digital signal and then processes the digital signal to generate high and low outputs that are consistent with the high and low outputs that would have been generated using the circuitry described above. For example, the DSP may process the input signal to remove signal components occurring outside the frequency range used for communications, analyze the remaining signal to identify the communication signals then provide an output signal that drives high and low with the communication signals.

Figure 4A:
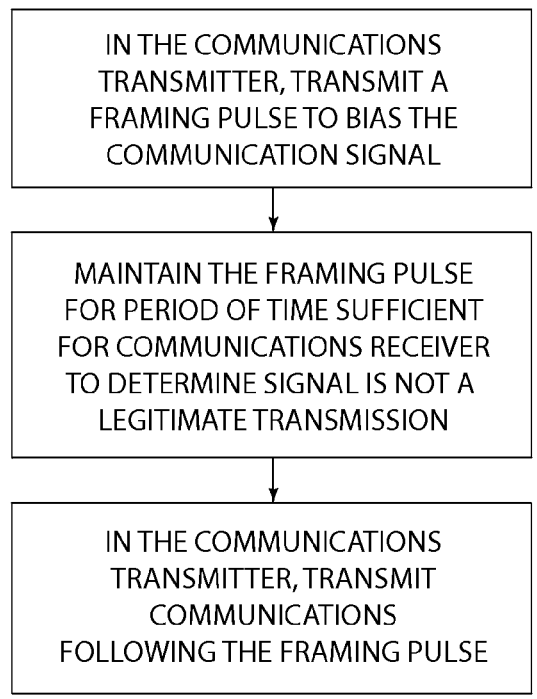
FIG. 4A is a flow chart showing the general steps of a method for transmitting communications in accordance with an embodiment of the present invention.

Operation of the illustrated embodiment of the present invention will now be described with reference to FIGS. 4-6. Referring now to FIG. 4A, the present invention provides a method for transmitting data communications from the remote device 14 of an inductive power supply system 10. In general, the method includes the steps of: (a) in the communication transmitter, transmitting 100 a framing pulse that presents the communication receiver with a bit sequence that does not exist in legitimate data communications, (b) maintaining 102 the framing pulse for a period of time sufficient for the communications receiver to recognize the framing pulse or recognize that the signal is not a legitimate message and (c) transmitting 104 communications following the framing pulse. The framing pulse transmitting step may include the step of applying a communication load, such as a load resistor, to the circuitry in the remote device. The load resistor may be located in the circuit at essentially any point where its presence will be communicated to the communications receiver by reflected impedance. The communication transmitting step may include selectively applying the load resistor to produce the desired bit sequence. In the embodiment of FIG. 2, the remote device 14 includes communications load 56, which is used for generating the framing pulse and for sending communications.

Figure 4B:
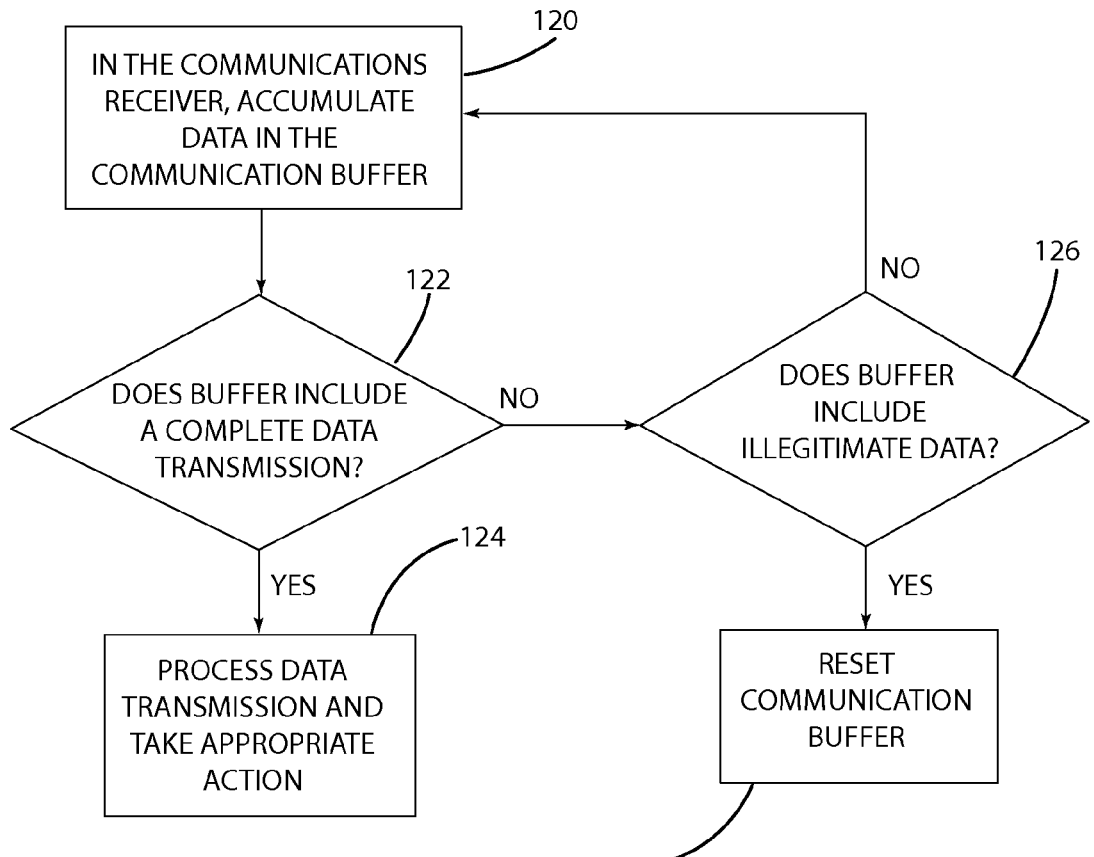
FIG. 4B is a flow chart showing the general steps of a method for receiving communications in accordance with an embodiment of the present invention.

Referring now to FIG. 4B, the present invention provides a method for receiving data communications from the remote device 14. In general, the method includes the steps of: (a) in the communication receiver, accumulating 120 data in a communication buffer, (b) evaluating 122 data in communication buffer to determine if it represents a complete legitimate data transmission, (c) if so, processing 124 the data transmission and taking appropriate action, (d) if not, evaluating 126 data in the communication buffer to determine if it represents illegitimate data, (e) if the data in the communication buffer does represent illegitimate data, then resetting 128 the communication buffer, and (f) if the data in the communication buffer does not represent a complete data transmission or illegitimate data, then continue to accumulate data in the communication buffer. The step of accumulating data in the communication buffer may include the step of sequentially storing each successive data bit in a successive data location in the communication buffer and incrementing a communication buffer pointer. The step of resetting the buffer may include resetting the communication buffer pointer so that it points to the first data location in the communication buffer.

As noted above, the illustrated embodiment of the present invention uses Bi-Phase mark modulation to send data signals. As a result, a legitimate data stream includes at least one transition during each clock cycle. In this embodiment, the framing pulse prevents a transition from occurring, for example, by biasing the signal to cause it to remain above or below the threshold for a period of time. The amount of time the signal remains without a transition may vary from application to application, but in the illustrated embodiment may be three (3) bit-times (i.e. three (3) times the amount of time associated with the transfer of a single bit).

The method may also include the step of selecting a communication load resistor (or other communication component) of sufficient magnitude to prevent anticipated noise variations from overriding the framing pulse. As described in more detail below, the framing pulse effectively "resets" the communications receiver 16 by sending a signal that remains above or below the communication threshold for a period of time. Accordingly, the framing pulse causes the communication signal to be transition-free for a period of time. If amplitude fluctuations caused by noise are significant enough to cause the amplitude of the signal to cross the communication threshold, it is possible that a transition will occur during the framing pulse. This may cause the communication receiver 16 to become occupied with efforts to determine if the signal is a legitimate communication signal. To reduce this risk, the communication load resistor may be selected to bias the modulations sufficiently beyond the communications threshold so that even when noise fluctuations are taken into consideration, the signal remains above or below the communications threshold.

Figure 5:
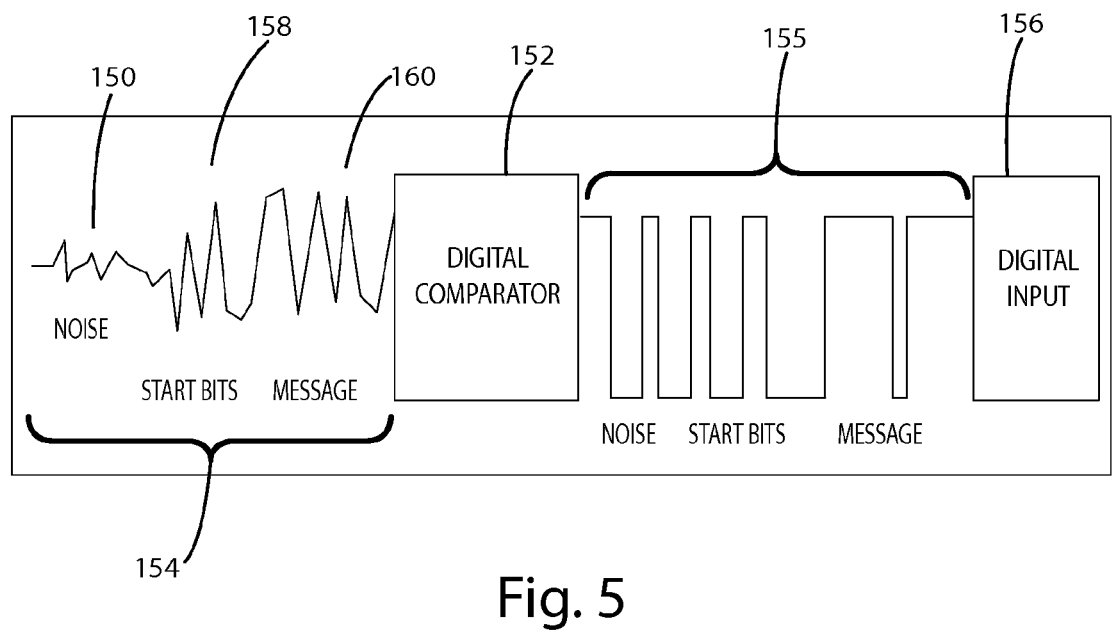
FIG. 5 is a diagram representing the conversion of signal variations into digital input.

FIG. 5 is an illustration of how noise 150 in the system can impact detection of communications. In this illustration, the system includes a digital comparator 152 that compares the input signal 154 to a reference (not shown) and provides a digital output 155 to the digital input 156 of the communication controller. As illustrated, noise 150 preceding start bits 158 and message 160 can, if of sufficient magnitude, cause changes in the output of the digital comparator 152. More specifically, noise 150 passing into the digital comparator 152 can mask the start bits 158 by mimicking the frequency of the communication with a large enough amplitude to switch the output of the digital comparator 152. When the noise 150 coincidentally mimics the start bits 158, the communications controller will begin to process the data beginning with the noise 150 rather than beginning at the start bits 158. As discussed in more detail below, this prevents the communication controller from accurately interpreting the message 160. Although the controller will eventually recognize that the signal is not a legitimate communication signal, the controller will have been occupied with efforts to attempt to extract a legitimate signal and may miss the legitimate signal.

When noise-based oscillations that occur at the communication frequency are passed through the comparator 64 and into the digital input of the controller 26, they may at first appear to be data communication signals. This may cause the controller 26 to become occupied with efforts to determine whether the apparent bits represent a legitimate communications transmission, which may in turn prevent the system from recognizing the legitimate data occurring after the noise. More specifically, in some applications, the controller 26 analyzes the data in the communication buffer as a whole to look for legitimate messages. The controller 26 begins to fill the buffer when it receives what has the potential to be a legitimate start bit. The controller 26 continues to fill the buffer with additional bits until it recognizes that data accumulated in the buffer represents a legitimate message or that the data accumulated in the buffer is not a legitimate message (for example, the data pattern may be invalid because it include too great of a transition time). If the buffer is partially filled with "bad" data created by noise, the controller 26 will include the "bad" data as part of the accumulated data in the buffer and will be incapable of recognizing a legitimate message in the middle of bad data. Accordingly, the controller 26 will not be capable of recognizing a legitimate transmission until the "bad" data is purged from the buffer. This occurs when the controller 26 recognizes that the data in the buffer does not represent a legitimate message and resets the pointer to the start of the buffer, which causes the system to begin to again accumulate data in an effort to recognize a legitimate message transmission. When the pointer is reset in this embodiment, the controller 26 loses any legitimate bits that may have been in the buffer so it is necessary to wait for the message to be resent before it can be recognized. The use of a framing pulse helps to overcome the problems associated with this and similar communication detection schemes.

Figure 6A:
FIGS. 6A-C are diagrams showing an exemplary signal at various stages within the detector circuit.
Figure 6B:
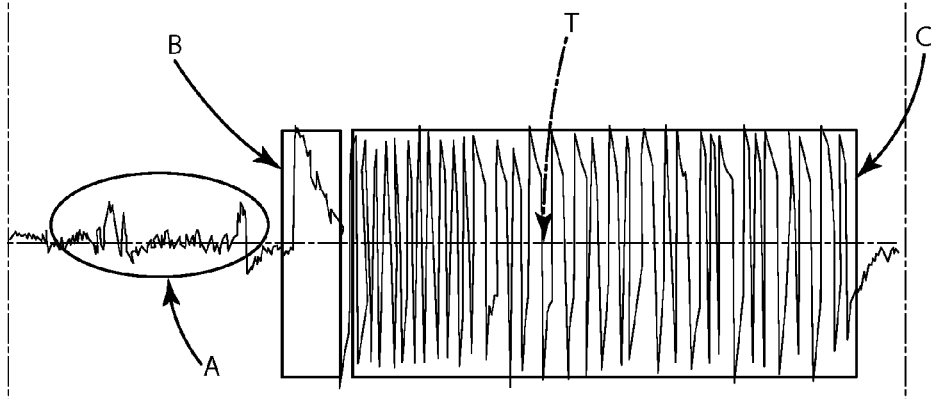
Figure 6C:
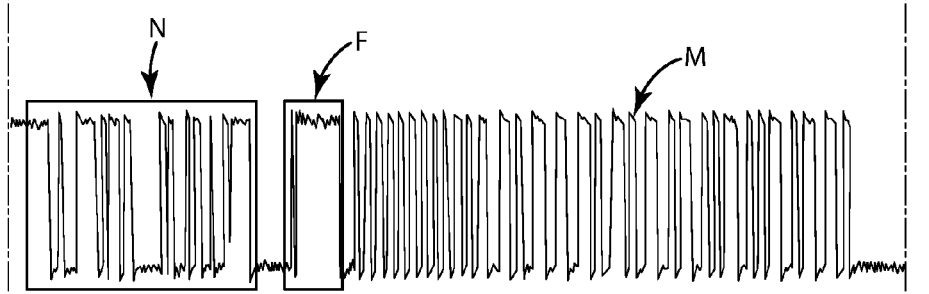

FIGS. 6A-C show the communication signal at various stages in the detector circuit 32 of FIG. 3. FIG. 6A shows oscillations in the current of the communications signal within the frequency range of communications after the signal has been filtered, but before it has been passed through the amplifier. FIG. 6B shows the amplified and filtered signal resulting from amplifying and filtering the signal shown in FIG. 6A. FIG. 6B also includes the communication threshold at line T. FIG. 6C shows the output of the comparator based on its processing of the signal shown in FIG. 6B. In all of these representations, the power transfer oscillations (i.e. carrier signal) and low frequency load shifts have been filtered out and only those oscillations that occur within the appropriate frequency range are shown.

As noted above, FIG. 6A shows oscillations or amplitude variations that may represent the current in the tank circuit over a period of time. The signal has been filtered to show only those oscillations that occur within the frequency range of communications. More specifically, this illustration shows the signal after it has been passed from the current sensor 60, through the low pass filter 66 and the high-pass filter 68. In this representation, oscillations outside the range of communications, such as the carrier signal (i.e. the oscillations of the power signal) and low frequency load shifts, have been filtered out and only those oscillations that occur within the appropriate frequency range are shown.

FIG. 6B represents the oscillations or amplitude variations of the signal after the signal of FIG. 6A has passed through the amplifier 70 and filter 72. In this embodiment, the amplifier 70 is an inverting amplifier. Accordingly, the signal is inverted as it passes through the amplifier 70. This inversion can be seen by comparing FIGS. 6A and 6B. Although the illustrated embodiment includes an inverting amplifier, the present invention may be implemented with a non-inverting amplifier. As noted above, oscillations outside the frequency range of communications have been filtered out so that FIG. 6B shows only those oscillations that are within a range of the communication signal frequencies. The signal shown in FIG. 6B can be broken into three general regions. Region A represents a time period during which no communication signal is being transmitted. During this period of time, noise within the remote device 14 caused oscillations at or near the frequency of communications. Region B represents a period of time during which the framing pulse is being transmitted by the communications transmitter 21. As can be seen, the framing pulse drives the signal low for a period of time. Finally, region C represents a period of time during which a legitimate communication signal is being sent by the communications transmitter 21. Although described in connection with FIG. 6B, these regions A-C extend vertically into FIGS. 6A and 6C. The framing pulse and communications signals have an increased amplitude because, when applied, the communication load creates an increase in the amplitude of the current greater than that created by the noise. The line T extending horizontally through the oscillation of FIG. 6B represents the communication threshold for this embodiment. The communication threshold represents the reference voltage 74 of the comparator 64. Accordingly, when the amplitude of the signal is above line T, the comparator outputs a high signal. When the signal is below line T, the comparator outputs a low signal.

FIG. 6C represents the output of the comparator 64 after the amplified and filtered signal shown in FIG. 6B has been compared against the reference voltage 74. As can be seen, the signal has been converted to a series of high and low signals. This stream of high and low signals is passed to controller 26 for interpretation. The signal of FIG. 6C includes a region N that includes false triggers that are caused by noise in region A of FIGS. 6A and 6B. Region F shows a period of time corresponding to the framing pulse. During this period of time, there are no transitions in the signal, which, as described in more detail below, effectively resets the communication controller preparing it to receive the following legitimate message M.

As noted above, the framing pulse results in a sequence of bits in the communication buffer that does not represent valid communications. In the illustrated embodiment, a Bi-Phase Mark modulation scheme is used for communication. With this type of scheme, there is a transition between "1" and "0" at every clock pulse. Also, a "1" bit includes an additional transition in the time between clock pulses (½ bit time). Accordingly, a legitimate data transmission will include a transition at least once during each clock pulse. This can be seen by examining the oscillations during the time frame of the communications packet. In the illustrated embodiment, the framing pulse biases the signal so that no transition occurs during the framing pulse. More specifically, the framing pulse causes the center point of the oscillations to shift so that the oscillations do not transition across the communications threshold. In FIG. 6A, the framing pulse caused the signal to shift down and remain below the communication threshold for a period of time. In some situations, the communication load may cause the signal to shift up and remain above the communication threshold. Whether the communication load biases the signal high or low may vary, depending upon the current system operating point, and therefore it may be beneficial to configure the communications receiver 16 to account for changes in bias (sometimes referred to as "comm inversion"). When a sufficient period of time passes without a transition, the controller 26 can positively determine that the incoming signal does not represent legitimate communications. This permits the controller 26 to be ready to interpret the legitimate communication signal that will follow immediately after the framing pulse. If desired, the framing pulse may be of sufficient length to ensure that the entire communications buffer has been purged of any bit sequences that might conceivably represent a legitimate communication. In many applications, the framing pulse will be able to effectively reset communications even if the controller 26 is not configured to look for framing pulses. For example, in applications where the controller 26 resets communications when an illegitimate string of data is received, the controller 26 will reset the communications in response to the framing pulse because it provides a pattern that exceeds the maximum bit time.

If desired, the controller 26 may be configured to look for framing pulses. In such applications, the controller 26 may be configured to wait for a transition-free period of fixed length before concluding that it is receiving a framing pulse. For example, in one embodiment, the controller 26 may be configured to determine that a framing pulse has been received if there is no transition for a period of time that is equivalent to three bit times.

If desired, the controller 26 may use the framing pulse to determine whether the communication load 56 is biasing the signal high or low. For example, the controller 26 can evaluate the output from the detector circuit 32 to make the determination. In this embodiment, if the framing pulse results in a high output from the detector circuit 32 then the communication load 56 is biasing the signal high, and if the framing pulse results in a low output then the communication load 56 is biasing the signal low. This information may be useful in implementing a communication detection scheme. For example, in applications where it is desirable to detect communications by looking at only one edge of a communication pulse, knowing the communication bias allows the system to decide whether to look at transitions as they cross the communication threshold from high to low or from low to high.

Figure 2:
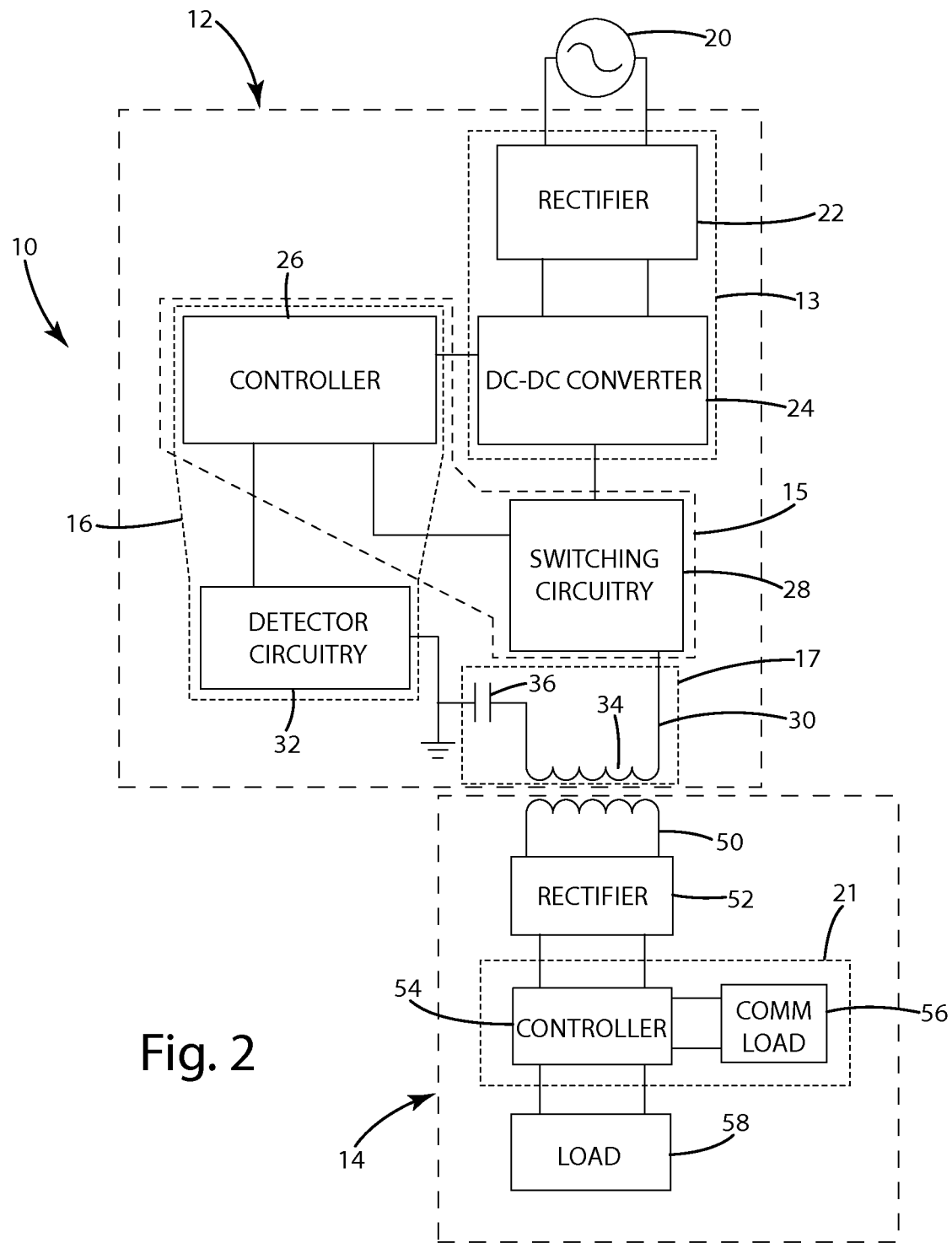
FIG. 2 is a schematic representation of one embodiment of the wireless power transfer system.
Figure 7:
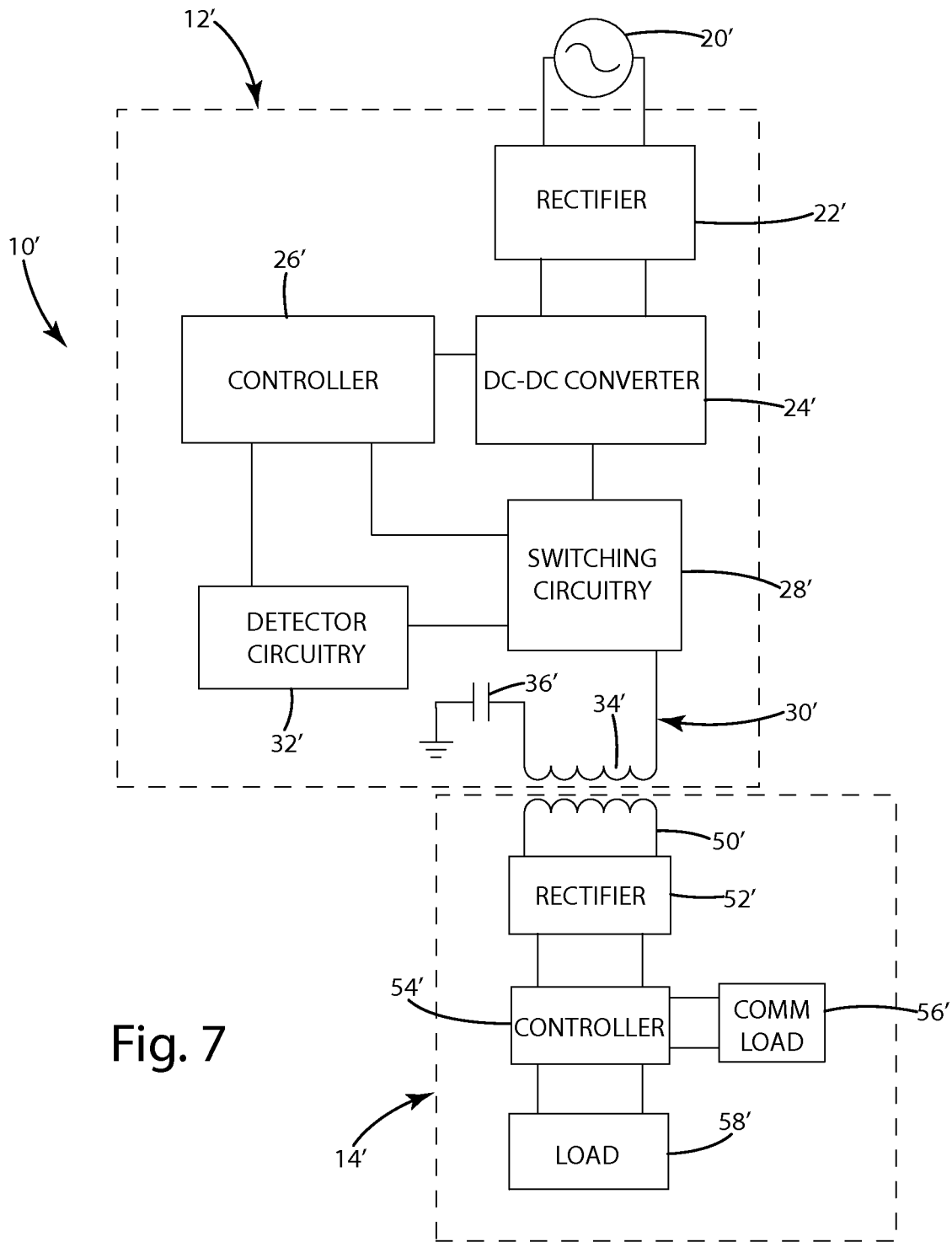
FIG. 7 is a schematic representation of a first alternative embodiment of a wireless power transfer system.
Figure 8:
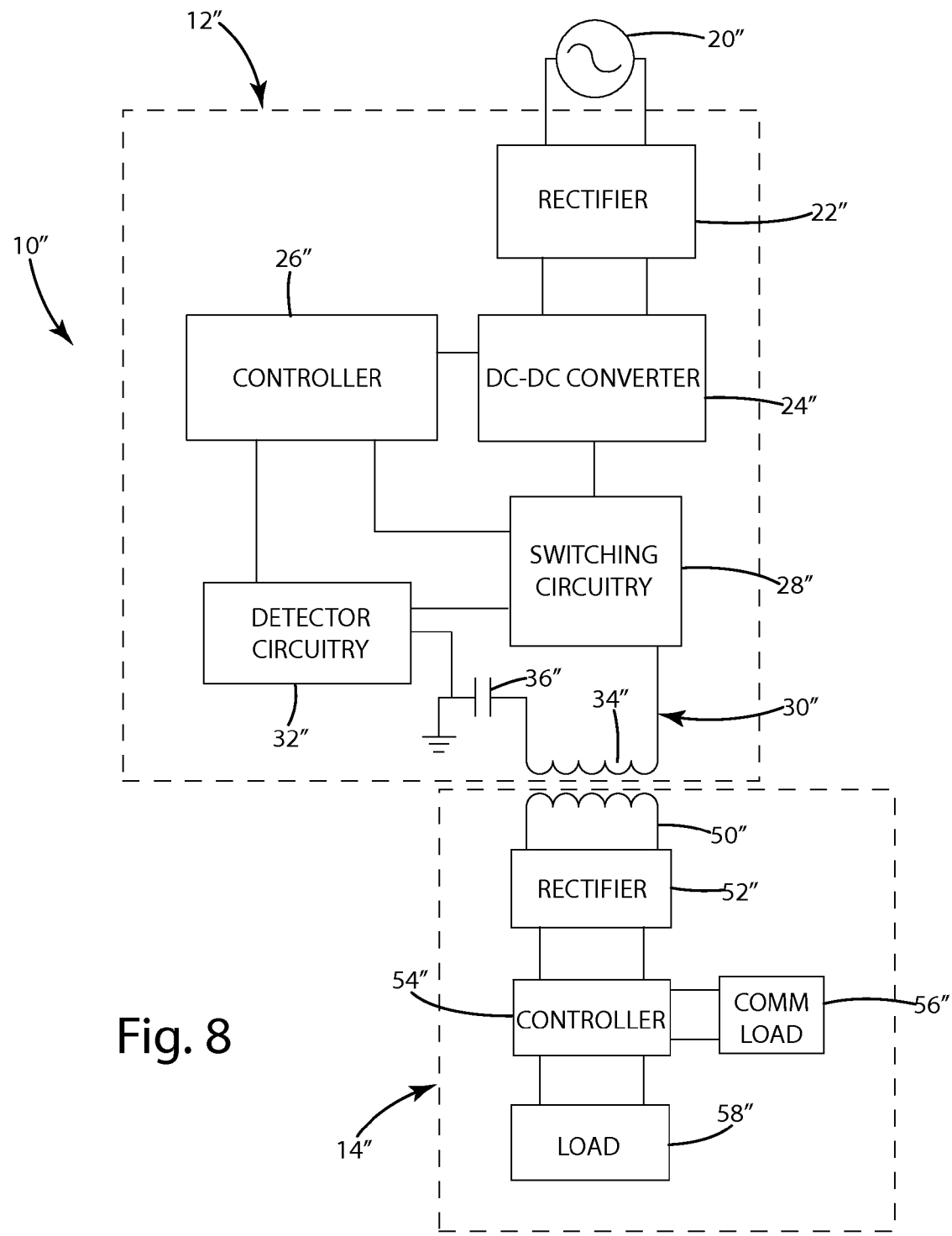
FIG. 8 is a schematic representation of a second alternative embodiment of a wireless power transfer system.

In the embodiment of FIGS. 1-3, the communication receiver 16 includes a detector circuit 32 that demodulates communications through a current sense transformer 60 that provides an output representative of the current in the tank circuit 30. The communication receiver 16 may operate using alternative methods and apparatus. For example, as shown in FIG. 7, the power supply 12' may include a detector circuit 32' that provides a signal indicative of the current in the input to the switching circuit 28'. The reference numerals in FIG. 7 correspond to those of FIG. 2, except that they are include the prime symbol in superscript to note that they are not necessarily identical to the corresponding components of FIG. 3. In this embodiment, the detector circuit 32' may include an amplifier coupled to the input of the switching circuit 28'. The output of the amplifier may be fed through filtering and conditioning circuitry before it is input to the comparator. As with the embodiment of FIGS. 1-3, the comparator output may be fed into the controller 26'. As another example, the power supply 12" may include a detector circuit 32" that detects communications using the phase relationship of the voltage of the input to the switching circuit 28" and the current in the tank circuit 30" (See FIG. 8). The reference numerals in FIG. 8 correspond to those of FIG. 2, except that they include the double prime symbol in superscript to note that they are not necessarily identical to the corresponding components of FIG. 3. As a further example (not shown), the power supply may include a detector circuit that detects communication using the voltage in the tank circuit. Operation of some of these alternative systems and methods for detecting communications is described in more detail in U.S. Provisional Application No. 61/298,021, entitled SYSTEMS AND METHODS FOR DETECTING DATA COMMUNICATION OVER A WIRELESS POWER LINK and filed on Jan. 25, 2010, which is incorporated herein by reference in its entirety.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular. This disclosure is presented for illustrative purposes and should not be interpreted as an exhaustive description of all embodiments of the invention or to limit the scope of the invention to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features and/or elements and that might individually or cooperatively provide a collection of benefits. The present invention is not limited to only those embodiments that include all of these features and/or elements or that provide all of the stated benefits. Instead, the present invention may extend to any permutation, combination or subcombination of the disclosed features and/or elements.

The embodiments of the invention in which an exclusive property or privilege is claimed are defined as follows:

1. A remote device configured to wirelessly receive power from a wireless power supply comprising:
    a principle load operating on electrical power;
    a power receiver configured to wirelessly receive power for said principle load from a wireless power supply;
    a communications transmitter for sending communication to the wireless power supply by backscatter modulation, said communication transmitter having a communication load and being configured to generate a communication signal by selectively applying said communication load to selectively vary an impedance of the remote device, said communication transmitter configured to preface each communication with a framing pulse, said framing pulse being a signal that does not correspond to any legitimate communication signal; and wherein said communication load is selected to bias said communication signal sufficiently to prevent noise from causing a transition in said communication signal.

2. The remote device of claim 1 wherein said communication transmitter is configured to employ a biphase modulation scheme having at least one transition during each clock cycle.

3. The remote device of claim 2 wherein said framing pulse is a signal having no transition for a period of time greater than one clock cycle.

4. The remote device of claim 3 wherein said communication load is separate from said principle load.

5. The remote device of claim 4 wherein said communication load is a communication resistor.

6. The remote device of claim 5 wherein a resistance of said communication resistor is selected to bias said communication signal sufficiently to prevent noise from causing a transition in said communication signal.

7. The remote device of claim 3 wherein said communication transmitter is configured to send communications in communications packets, said communication transmitter configured to preface each communication packet with a framing pulse.

8. The remote device of claim 4 wherein said communication load is a communication capacitor.

9. A wireless power supply system comprising:
a wireless power supply having a power transmitter, signal generating circuitry to apply a power supply signal to said power transmitter and a communication receiver for receiving communications communicated through said power transmitter by backscatter modulation, said wireless power supply controlling said signal generating circuitry as a function of said communications received by said communication receiver; and
a remote device capable of being placed in sufficient proximity to said wireless power supply to wirelessly receive power from said wireless power supply, said remote device having a principle load, a power receiver and a communication transmitter, said communication transmitter configured to generate a communication signal to transmit communications to said communication receiver by backscatter modulation, said communication transmitter configured to preface each communication with a framing pulse, said framing pulse being a signal that does not correspond to any legitimate communication signal; and
wherein said communication transmitter includes a communication load and is configured to generate said communication signal by selectively applying said communication load, wherein said communication load is selected to bias said communication signal sufficiently to prevent noise from causing a transition in said communication signal.

10. The wireless power supply of claim 9 wherein said communication transmitter is configured to generate said framing pulse by applying the communication load to selectively vary an impedance of the remote device.

11. The wireless power supply of claim 10 wherein said communication transmitter is configured to employ a biphase modulation scheme in which communication signals have at least one transition during each clock cycle, and wherein said framing pulse is a signal having no transition for a period of time greater than one clock cycle.

12. The wireless power supply of claim 11 wherein said communication transmitter is configured to send communications in communications packets, said communication transmitter configured to preface each communication packet with a framing pulse.

13. The wireless power supply of claim 11 wherein said communication receiver includes a communication threshold dictating a value of said communication signal; and wherein said communication load is selected to bias said communication signal away from said communication threshold a sufficient amount to prevent noise anticipated in the wireless power supply from causing a transition in said communication signal.

14. The wireless power supply of claim 13 wherein said communication receiver includes a communication buffer, said communication receiver being configured to clear said communication buffer when a framing pulse is recognized.

15. The wireless power supply of claim 11 wherein said communication receiver includes a communication threshold dictating a value of said communication signal; and wherein said communication load is selected to bias said communication signal so that load fluctuations caused by noise while said communication load is applied will not cause said communication signal to cross said communication threshold.

16. The wireless power supply of claim 9 wherein said communication transmitter is configured to generate communications by selectively applying said communication load to selectively vary an impedance of the remote device.

17. The wireless power supply of claim 16 wherein said communication transmitter is configured to generate said framing pulse by applying said communication load to selectively vary an impedance of the remote device.

18. A method for transmitting communication signals from a remote device to a wireless power supply in a wireless power transfer system including:
providing a remote device with a communication transmitter for generating communication signals by selectively applying a communication load to selectively vary an impedance of the remote device, the variations in impedance being communicated to the wireless power supply by reflected impedance, wherein the communication load is selected to bias the communication signals sufficiently to prevent noise from causing a transition in the communications signals;
transmitting a framing pulse by varying the impedance of the remote device in a manner that does not correspond with legitimate data communications, whereby the wireless power supply will recognize that the framing pulse is not a legitimate data communication; and
transmitting data communications following the framing pulse.

19. The method of claim 18 wherein the communication transmitter is configured to transmit communications using backscatter modulation.

20. The method of claim 19 wherein the communication transmitter is configured to transmit communications using a modulation scheme with at least one transition across a communication threshold in a period of time.

21. The method of claim 20 wherein said transmitting a framing pulse step includes generating a communication signal without any transition across the communication threshold during the period of time.

22. The method of claim 21 wherein said transmitting a framing pulse step includes applying the communication load to the remote device for greater than the period of time.

23. The method of claim 22 wherein the communication load includes a communication resistor.

24. The method of claim 21 further including the step of selecting the communication load with sufficient magnitude to bias the communication signal so that load fluctuations caused by noise in the wireless power supply system while the communication load is applied will not cause the communication signal to cross the communication threshold.

25. The method of claim 24 further including the steps of:
    maintaining a communication buffer in the wireless power supply; and
    clearing the communication buffer when a framing pulse is recognized by the communication receiver.

\* \* \* \* \*